(12) United States Patent
Cradick et al.

(10) Patent No.: US 7,697,962 B2
(45) Date of Patent: Apr. 13, 2010

(54) CELLPHONE USAGE AND MODE DETECTION AND AUTOMATIC SPEAKERPHONE TOGGLE

(75) Inventors: Ryan K. Cradick, Rochester, MN (US); Zachary A. Garbow, Rochester, MN (US); Kevin G. Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 11/423,173

(22) Filed: Jun. 9, 2006

(65) Prior Publication Data

US 2007/0287491 A1   Dec. 13, 2007

(51) Int. Cl.
*H04M 1/00* (2006.01)
(52) U.S. Cl. .................................................. 455/569.1
(58) Field of Classification Search ............... 455/569.1, 455/575.1, 550.1
See application file for complete search history.

(56) References Cited

U.S. PATENT DOCUMENTS

| 6,611,596 | B1* | 8/2003 | Cannon et al. ......... 379/420.01 |
| 7,196,316 | B2* | 3/2007 | Chan et al. ................... 250/221 |
| 7,430,439 | B2* | 9/2008 | Griffin et al. .............. 455/552.1 |
| 2003/0193946 | A1* | 10/2003 | Gernert et al. ............... 370/389 |
| 2006/0081771 | A1* | 4/2006 | Eliad Wardimon .......... 250/221 |

* cited by examiner

*Primary Examiner*—Nick Corsaro
*Assistant Examiner*—Vladimir Magloire
(74) *Attorney, Agent, or Firm*—Cantor Colburn LLP; Randall Bluestone

(57) ABSTRACT

A cellular communication device including a housing having a front section and a rear section complementary to the front section such that the front and rear section align and mate together. A cavity is formed by mating of the front and rear section of the housing. An electronic circuit board having a microprocessor is located within the cavity. At least one of an accelerometer, a tilt sensor and a thermal sensor is operably connected to the microprocessor for detecting displacement of the cellular communication device from the ear of the user during communication.

8 Claims, 2 Drawing Sheets

CELLPHONE USAGE AND MODE DETECTION AND AUTOMATIC SPEAKERPHONE TOGGLE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to cellular communication devices, and in particular, to a cellular phone having usage mode detection and automatic speakerphone toggling.

2. Description of Background

Normal usage of a cellular phone requires the user of the cellular phone to hold the device to their ear. This provides quick access, private conversation, and for the most part, comfort. However, there are many reasons why a user may temporarily remove the cellular phone from their ear during the conversation, but not want to break the conversation. For example, a temporary need to use both hands may arise. Additionally, as cellular phones gain more functionality, a cellular phone user may wish to check their e-mail or find a file on their phone that is appropriate for the conversation or snap a picture to send to the other caller, etc.

Currently, there are alternatives for allowing the cellular phone user to perform other actions mid-conversation, however, these alternatives have drawbacks. For instance, headsets and earpieces are available for usage with cellular phones. Yet, many people do not use these devices since they require an additional attachment and additional setup time. Many people do not want to tote around an earpiece, nor do they want to plug it in and insert it into their ear for each call. Also, many people find these devices to be quite inconvenient.

Alternatively, many cellular phones possess speakerphone capability but this does not provide privacy for the user of the cellular phone. Most people located within the vicinity of the cellular phone user can hear the complete conversation of the cellular phone user and speakerphone usage is not appropriate in many situations.

Thus, it would be desirable to have a cellular phone that detects whether the cellular phone is being held to the ear of the user or removed from the ear of the user temporarily during conversation and, temporarily toggles between normal usage and louder speakerphone functionality.

SUMMARY OF THE INVENTION

The shortcomings of the prior art are overcome and additional advantages are provided through the provision of a cellular communication device including a housing having a front section and a rear section complementary to the front section such that the front and rear section align and mate together. A cavity is formed by the mating of the front and rear section of the housing. An electronic circuit board having a microprocessor is located within the cavity. At least one of an accelerometer, a tilt sensor and a thermal sensor is operably connected to the microprocessor for detecting displacement of the cellular communication device from the ear of the user during communication.

Additional features and advantages are realized through the techniques of the present invention. Other embodiments and aspects of the invention are described in detail herein and are considered a part of the claimed invention. For a better understanding of the invention and its advantages and features, refer to the description and to the drawings.

TECHNICAL EFFECTS

As a result of the summarized invention, technically we have achieved a solution for a cellular communication device that detects whether the cellular communication device is being held to the ear of the user or removed from the ear of the user temporarily during conversation.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

Figure 1:
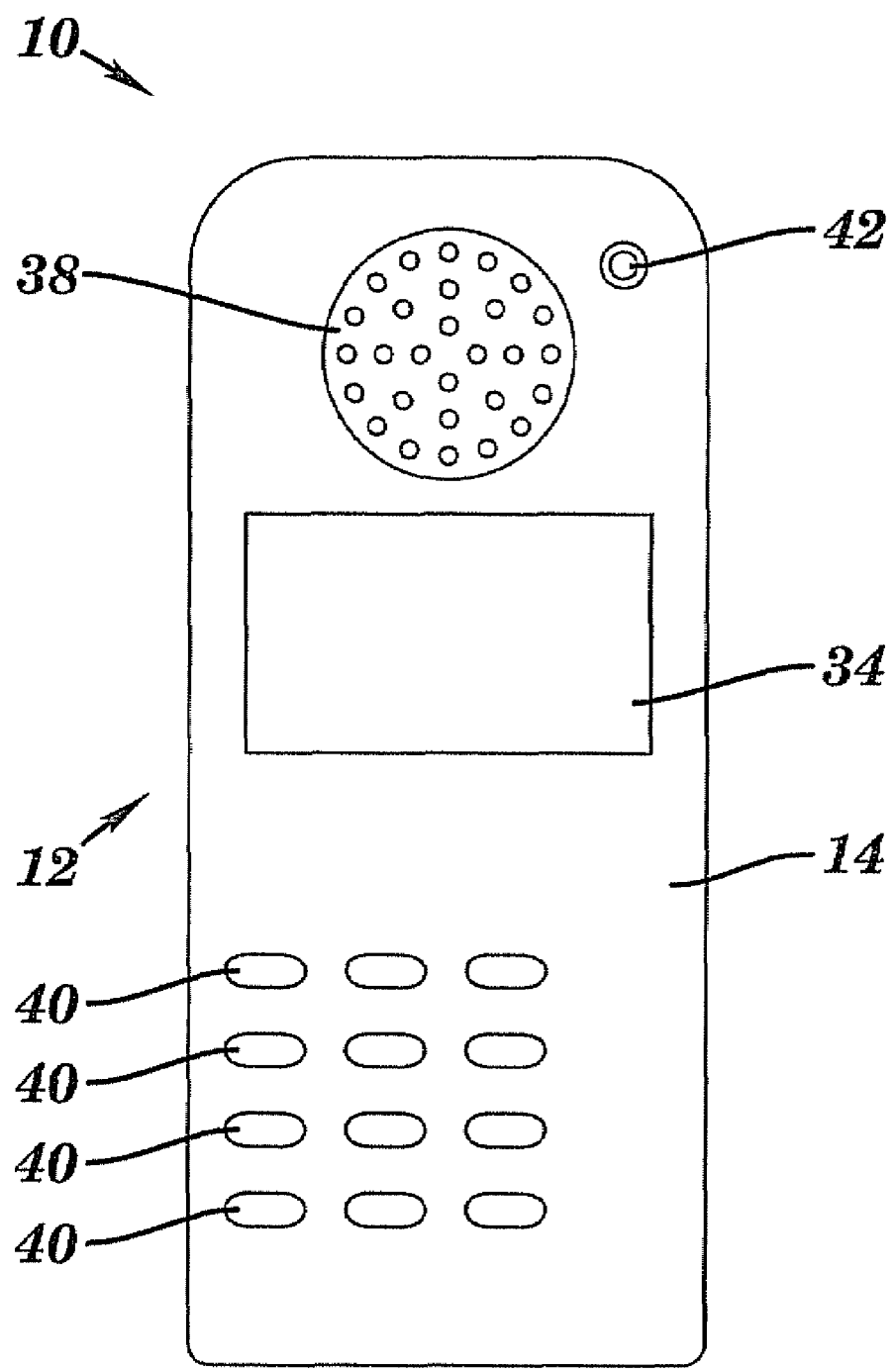
FIG. 1 illustrates one example of a cellular communication device.
Figure 2:
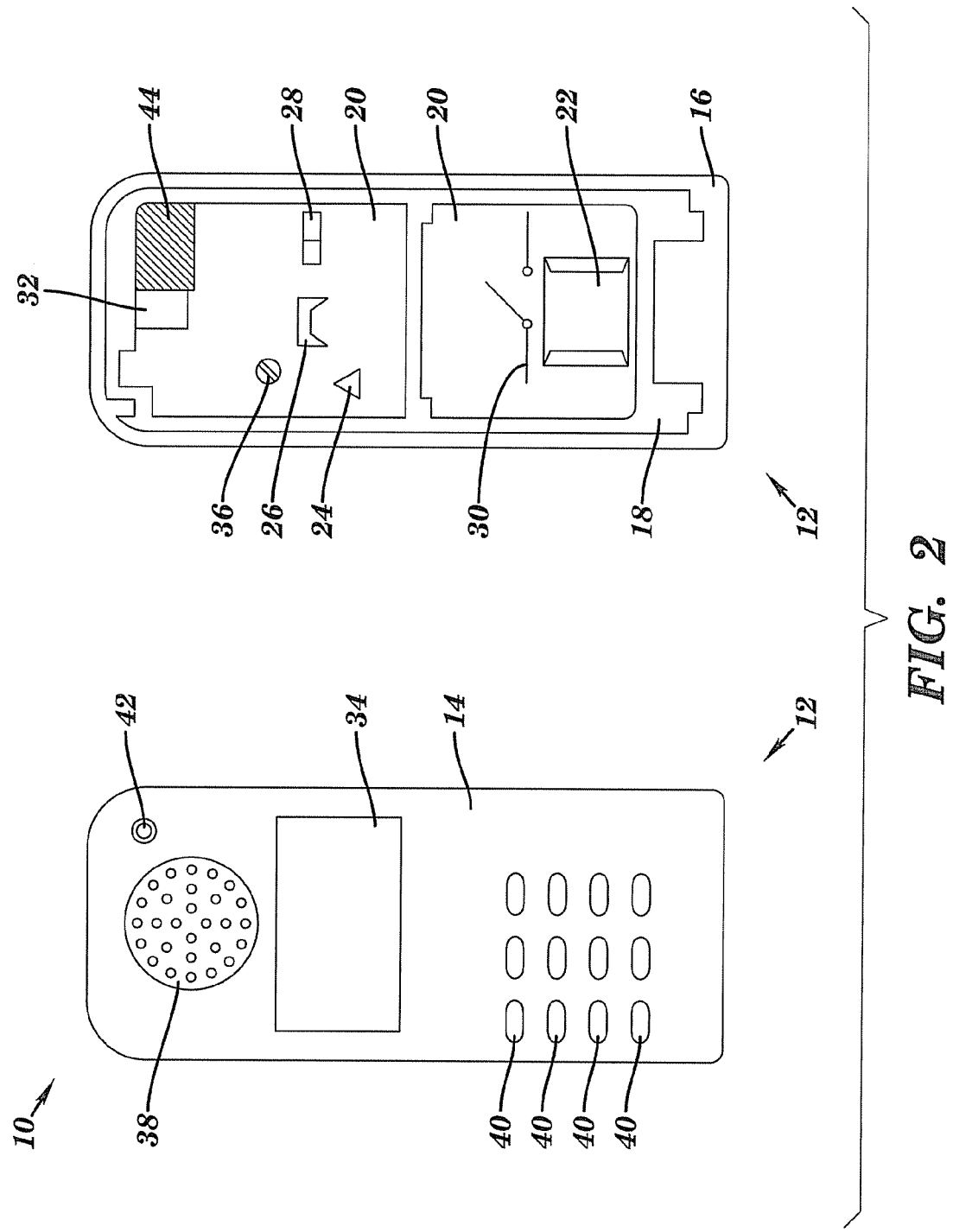
FIG. 2 illustrates one example of a circuit board of the cellular communication device shown in FIG. 1.

The detailed description explains the preferred embodiments of the invention, together with advantages and features, by way of example with reference to the drawings.

DETAILED DESCRIPTION OF THE INVENTION

Referring to the Figures, wherein like numerals indicate corresponding parts throughout the several views, a cellular communication device 10 is shown. By example, and not meant to be limiting, the cellular communication device 10 could be the standard cellular phone used by many people for wireless communication. Alternatively, the communication device 10 could be one of many Personal Digital Assistants ("PDAs") being sold that also provide wireless communication capability.

The cellular communication device 10 includes a housing 12 having a front section 14 and a rear section 16 complementary to the front section 14, such that the front and rear section 14, 16, respectively, align and mate together. Furthermore, the housing 12 as shown is substantially rectangular shaped but the housing 12 may be produced in other shapes, such as square, etc.

A cavity 18 is formed by the mating of the front and rear section 14, 16, respectively, of the housing 12. The mating of the front section 14 and the rear section 16 may be performed in a variety of ways including but not limited to, adhesively mating the front and rear section 14, 16, respectively, together. Alternatively, the front section 14 and the rear section 16 may be formed such that the front section 14 and the rear section 16 mate by snap-fit to one another.

An electronic circuit board 20 having a microprocessor 22 is located within the cavity 18 and secured to the rear section 16 of the housing 12. As well known by those skilled in the art, the electronic circuit board 20 is insulated and interconnects circuits and components. The circuits and components, such as the microprocessor 22 may be either mounted or etched onto the electronic circuit board 20. Also, as well known by those skilled in the art, the microprocessor 22 is the integrated circuit that contains the entire central processing unit of the cellular communication device 10.

At least one of an accelerometer 24, a tilt sensor 26 and a thermal sensor 28, are operably connected to the microprocessor 22 for detecting displacement of the cellular communication device 10 from the ear of the user during communication. While the cellular communication device 10 is held to the user's ear, the cellular communication device 10 functions in a normal manner. However, if the user needs to remove the cellular communication device 10 from their ear temporarily, the cellular communication device 10 detects this movement via the accelerometer 24, the tilt sensor 26 or the thermal sensor 28 and automatically toggles to speakerphone mode to allow seamless continuation of the conversation.

In embodiments of the invention, when a call is initiated (e.g., a connection is established between a caller and called), the microprocessor 22 may record an initial measurement from one or more of the accelerometer 24, a tilt sensor 26 and a thermal sensor 28. The output signals from the accelerometer 24, a tilt sensor 26 and a thermal sensor 28 are monitored. If one or more of the values from the accelerometer 24, a tilt sensor 26 and a thermal sensor 28 differs from its corresponding initial value by more than a threshold amount, this indicates that the cellular communication device 10 has moved away from the user's ear and that speakerphone mode should be entered. Alternatively, the microprocessor may rely on the rate of change (regardless of the initial value) of the value from one or more of the accelerometer 24, a tilt sensor 26 and a thermal sensor 28 to indicate that the cellular communication device has moved from the user's ear. In alternate embodiments, the microprocessor 22 compares values from one or more of the accelerometer 24, a tilt sensor 26 and a thermal sensor 28 to predefined ranges (without regard to rate of change) to determine that the cellular communication device has moved from the user's ear.

A toggle switch 30 is operably connected to the microprocessor 22 for toggling the cellular communication device 10 into speakerphone mode once it has been detected that the cellular communication device 10 has been displaced from the ear of the user. Toggle switch 30 is represented diagrammatically as a mechanical switch, but the toggling to speaker mode may be performed using electronic circuitry (e.g. transistor switches) or software commands. Thus, the toggle switch 30 may encompass a variety of mechanisms for toggling to and from speaker mode.

A sound indicator 32 is operably connected to the microprocessor 22 for indicating to the listener on the other end of the conversation that the cellular communication device 10 is in speakerphone mode. Provided that the cellular communication device 10 toggles to speakerphone mode, the listener is notified of the usage change by a faint sound or beep rendered by the sound indicator 32. The sound rendered allows the listener to adjust their tone or words appropriately since the conversation is no longer private.

A display 34 is operably connected to the microprocessor 22. The display 34 is embedded in the front section 14 of the housing 12 for displaying information. As known by those skilled in the art, the display 34 can be formed in a variety of shapes plus sizes and may illuminate with a black on white background or be multi-colored.

A light source 36 is operably connected to the microprocessor 22 for illuminating the display 34. The light source 36 intensifies once it has been detected that the cellular communication device 10 is displaced from the ear of the user. The light source 36 may be formed to be continuously active or may be operationally activated for short periods of time, etc.

A speaker 38 is operably connected to the microprocessor 22. The speaker 38 is embedded in the front section 14 of the housing 12 and converts electric signals to sound and projects it. The speaker 38 may be produced in a variety of styles and sizes as one in the art is fully knowledgeable about.

A keypad 40 is operably connected to the microprocessor 22. The keypad 40 is embedded in the front section 14 of the housing 12. As should be known and appreciated by those skilled in the art, the keypad 40 can be produced in a variety of forms. For example, the keypad 40 may illuminate when active, etc.

A power on/off button 42 is operably connected to the microprocessor 22. The power on/off button 42 is embedded in the front section 14 of the housing 12. The power on/off button 42 may be placed in various locations on the housing 12 and may be produced in various shapes, as should be known by one skilled in the art.

Optionally, instead of automatically toggling to speakerphone mode, an audible prompt can be set up to inform the parties connected to the communication that the cellular communication device 10 is unavailable. One way to indicate unavailability of the cellular communication device 10 is to use a voicemail indicator 44 that is operably driven by the microprocessor 22 for indicating to the user of the cellular communication device 10 that the cellular communication device 10, is temporarily unavailable once it has been detected that the cellular communication device 10 has been displaced from the ear of the user.

While the preferred embodiment to the invention has been described, it will be understood that those skilled in the art, both now and in the future, may make various improvements and enhancement which fall within the scope of the claims which follow. These claims should be construed to maintain the proper protection for the invention first described.

What is claimed is:

1. A cellular communication device comprising:
   a housing having a front section and a rear section complementary to the front section such that the front and rear section align and mate together;
   a cavity formed by the mating of the front and rear section of the housing;
   an electronic circuit board having a microprocessor, the electronic circuit board and microprocessor located within the cavity;
   an accelerometer, a tilt sensor and a thermal sensor operably connected to the microprocessor, the microprocessor for detecting displacement of the cellular communication device from the ear of the user during communication in response to the accelerometer, the tilt sensor and the thermal sensor;
   a toggle switch operably connected to the microprocessor for toggling the cellular communication device into speakerphone mode upon detecting that the cellular communication device has been displaced from the ear of the user;
   a sound indicator operably connected to the microprocessor for indicating to a person calling the cellular communication device that the cellular communication device is in speakerphone mode;
   a display operably connected to the microprocessor and embedded in the front section of the housing for displaying information; and
   a light source operably connected to the microprocessor for illuminating the display, wherein the light source intensifies once it has been detected that the cellular communication device is displaced from the ear of the user.

2. The device as set forth in claim 1 further including a speaker operably connected to the microprocessor and embedded in the front section of the housing.

3. The device as set forth in claim 2 further including a keypad operably connected to the microprocessor and embedded in the front section of the housing.

4. The device as set forth in claim 3 further including a power on/off button operably connected to the microprocessor and embedded in the front section of the housing.

5. The device as set forth in claim 1 further including a voicemail indicator operably connected driven by the microprocessor for indicating to the user of the cellular communication device that the cellular communication device is temporarily unavailable upon detecting that the cellular communication device has been displaced from the ear of the user.

6. The device as set forth in claim 1 wherein the microprocessor detects a rate of change in a value from the accelerometer, the tilt sensor and the thermal sensor for detecting displacement of the cellular communication device from the ear of the user during communication.

7. The device as set forth in claim 1 wherein the microprocessor detects an initial value from the accelerometer, the tilt sensor and the thermal sensor upon initiation of communication and detects displacement of the cellular communication device from the ear of the user during communication when a current value from the accelerometer, the tilt sensor and the thermal sensor differs from the initial value by more than a threshold.

8. The device as set forth in claim 1 wherein the microprocessor compares values from the accelerometer, the tilt sensor and the thermal sensor to predefined ranges to detect displacement of the cellular communication device from the ear of the user during communication.

* * * * *